(12) United States Patent
Deeds

(10) Patent No.: US 6,987,222 B2
(45) Date of Patent: Jan. 17, 2006

(54) DETERMINING SIMILARITY BETWEEN ARTISTS AND WORKS OF ARTISTS

(75) Inventor: Paul Deeds, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 10/673,978

(22) Filed: Sep. 29, 2003

(65) Prior Publication Data

US 2005/0071122 A1 Mar. 31, 2005

(51) Int. Cl.
*G10H 1/18* (2006.01)
(52) U.S. Cl. .................................... 84/615; 434/307 A
(58) Field of Classification Search ................. 84/601, 84/602, 609, 611, 612, 615, 649, 470 R; 434/307 A
See application file for complete search history.

(56) References Cited

U.S. PATENT DOCUMENTS 6,182,044 B1 * 1/2001 Fong et al. ................. 704/270
6,352,432 B1 * 3/2002 Tsai et al. ................ 434/307 A
6,545,209 B1 4/2003 Flannery et al. .............. 84/609
2004/0055441 A1 * 3/2004 Katsuta ..................... 84/470 R
2004/0177744 A1 * 9/2004 Strasser et al. ........... 84/470 R

OTHER PUBLICATIONS

AMG Data /Content-*Data Licensing*, http://www.allmediaguide.com/data.html, 2 pages, Nov. 5, 2003.

* cited by examiner

*Primary Examiner*—David Martin
*Assistant Examiner*—Jianchun Qin
(74) *Attorney, Agent, or Firm*—Woodcock Washburn LLP

(57) ABSTRACT

A method of determining a numerical value of similarity as between a pair of artists is set forth. In the method, for each artist, a list of artist style values is calculated, where each artist style value is representative of a style of the artist and a weight of such style as exhibited by such artist. A set of style similarity values is also calculated, where each style similarity value sets forth a relative similarity as between two styles. Thereafter, based on the list of artist style values for each artist and the calculated set of style similarity values, a style list comparison similarity score is calculated to represent a relative similarity of the styles of the pair of artists.

17 Claims, 5 Drawing Sheets

DETERMINING SIMILARITY BETWEEN ARTISTS AND WORKS OF ARTISTS

TECHNICAL FIELD

The present invention relates to a method and mechanism for calculating a value representative of similarity between artists and/or works thereof. In particular, the present invention relates to such a method and mechanism whereby a user upon selecting an artist or work thereof may be presented with other similar artists or works thereof.

BACKGROUND OF THE INVENTION

A user at times may be listening to a musical composition such as a song as performed by a particular artist, may be watching a multimedia presentation such as a movie by a particular artist, or the like, and thereafter may decide that he or she would like to enjoy a similar composition or presentation (hereinafter 'work'), or would like to enjoy a work by a similar artist. In the prior art, such a user would have to rely on various commentary and/or recommendations by others, individual research, and the like to find such similar artists and/or works. Of course, such a method is imprecise and is bound to miss works/artists of interest as well as expose the user to works/artists that in fact are not satisfactorily similar to the user.

Algorithms do exist in the prior art that attempt to generate similar artists/works, such as for example the algorithm disclosed in U.S. Pat. No. 6,545,209, which is commonly assigned with the present disclosure and which is incorporated by reference in its entirety. However, such prior art as disclosed in U.S. Pat. No. 6,545,209 requires intensive human-generated data at an individual work level and therefore is relatively inefficient.

Accordingly, a need exists for a method and mechanism for determining similar artists/works that relies on data already generated for a plurality of artists and works and that therefore is relatively more efficient. Moreover, a need exists for such a method and mechanism that takes into account attributes and factors such as styles, tones, popularity, temporal factors, and the like.

SUMMARY OF THE INVENTION

The aforementioned needs are satisfied at least in part by the present invention in which a method of determining a numerical value of similarity as between a pair of artists is set forth. In the method, for each artist, a list of artist style values is calculated, where each artist style value is representative of a style of the artist and a weight of such style as exhibited by such artist. A set of style similarity values is also calculated, where each style similarity value sets forth a relative similarity as between two styles. Thereafter, based on the list of artist style values for each artist and the calculated set of style similarity values, a style list comparison similarity score is calculated to represent a relative similarity of the styles of the pair of artists.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
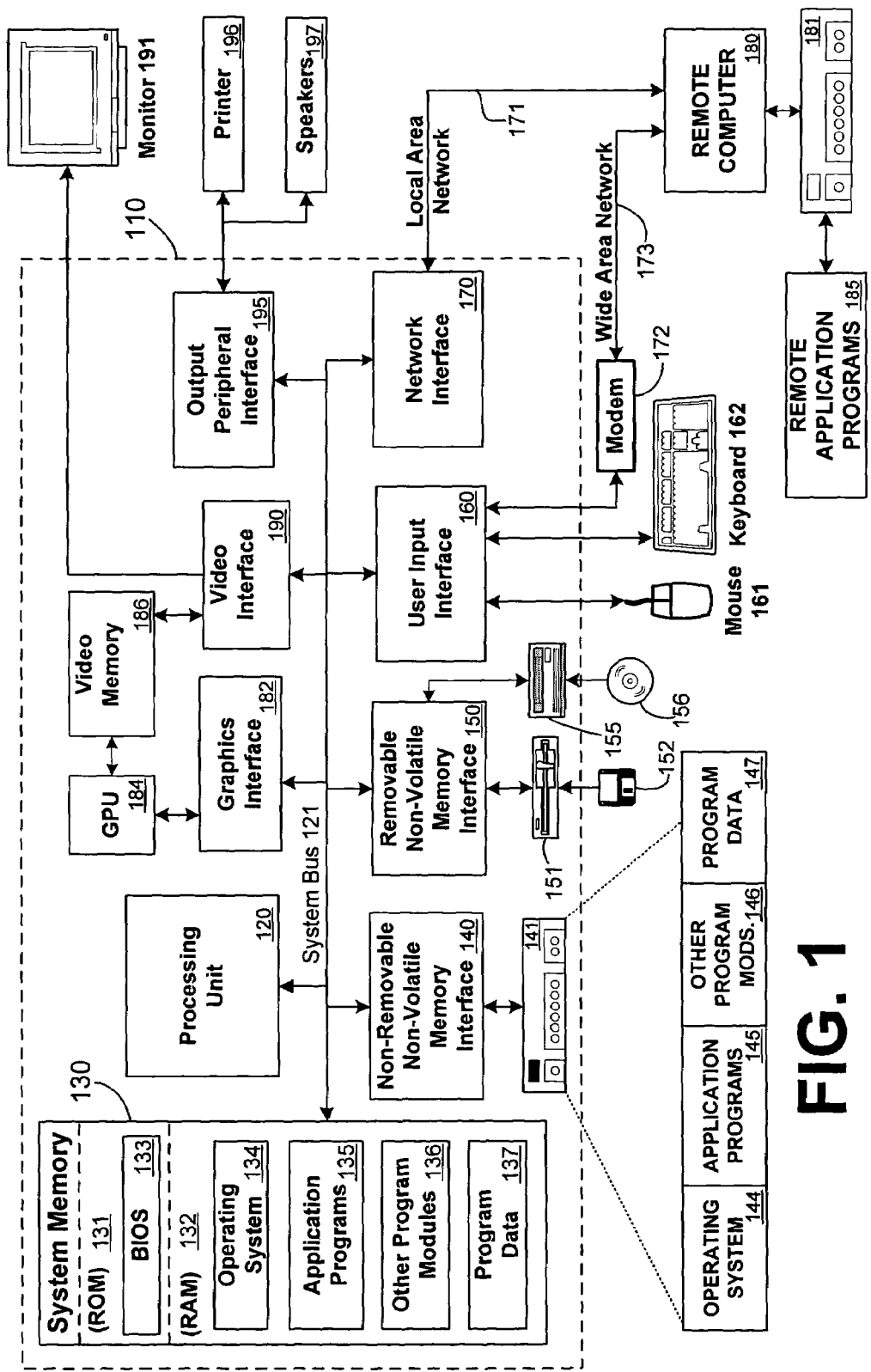
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
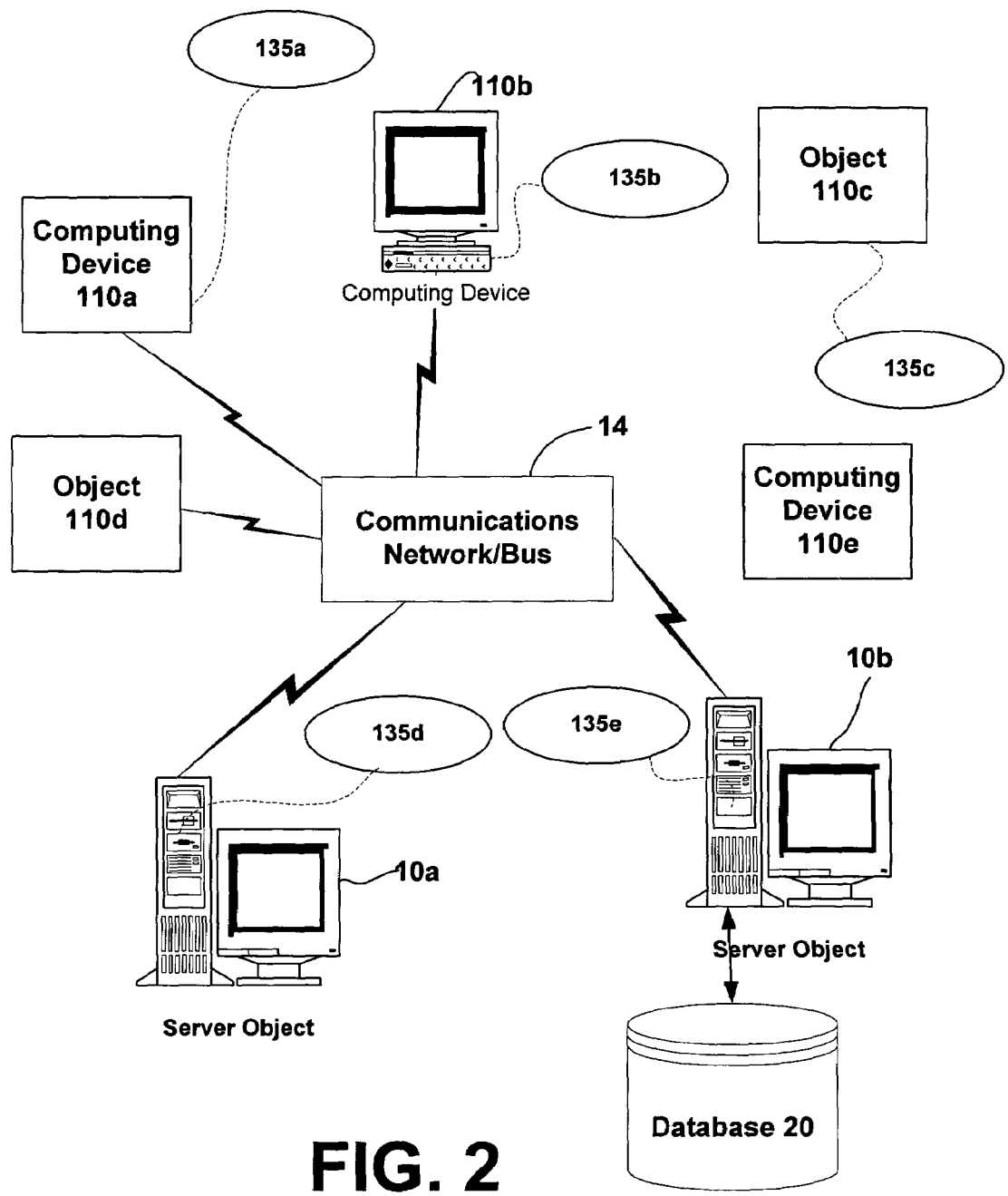
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Determining Similarity

In the present invention, information from one or more databases is employed to calculate numerical values representative of how similar an artist or a work thereof is similar to other artists or works thereof. Thus, such similarity values may be presented to a user reviewing a particular artist or work thereof, to allow such user to also review artists or works thereof similar to the particular artist or work thereof.

The present invention is specifically disclosed in terms of musical artists or the like and musical works thereof. However, it is to be appreciated that the invention is not limited to only musical artists and works thereof. Instead, the present invention, may be applied in connection with any other type of artists and works thereof, including motion picture, theater, and television artists including actors, directors, choreographers, and the like, and works thereof, visual artists including painters, sculptors, and photographers and the works thereof, and the like.

Figure 3:
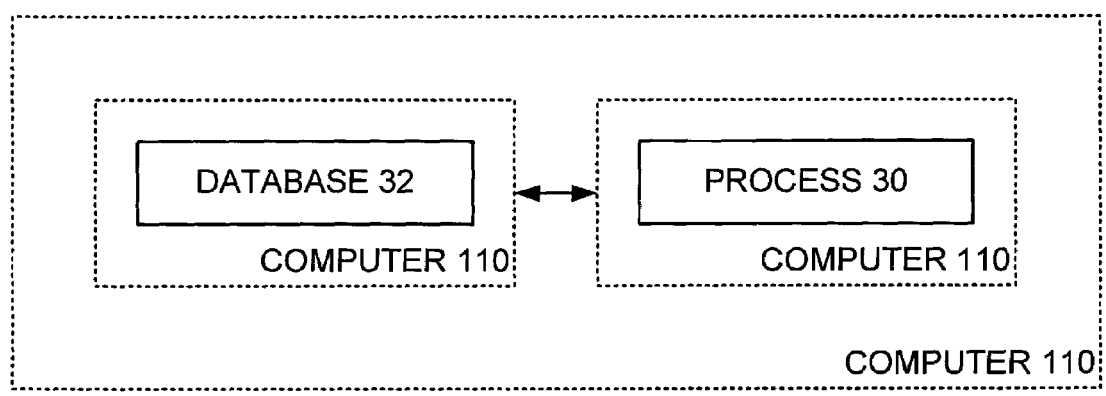
FIG. 3 is a block diagram showing a process on a computer and a database interacting to determine similarity as between artists/albums in accordance with one embodiment of the present invention.

In one embodiment of the present invention, and turning now to FIG. 3, the aforementioned calculation of numerical values representative of similarity are performed by a process 30 or the like operating on a computing device or the like such as computer 110 (FIG. 1), where the process accesses values available from a database 32 or the like that is either on the computing device or is on another computing device. Such database 32 may be any appropriate database without departing from the spirit and scope of the present invention.

For example, and in one particular embodiment of the present invention, the database is the AMG Pop Database, currently available from AMG (All Media Guide of Ann Arbor, Mich.) at www.allmusic.com. As may be appreciated, in such database 32, information has been compiled on each of multiple albums and artists, including objective and/or subjective ratings of the artist, the album, the style of the artist and the album, the tone of the artist and the album, and the like. In particular, the database 32 maintains information including the following:

| AMG Artist Data | |
|---|---|
| StyleWeight(Artist, Style) | For each artist and each of one or more styles of the artist (country, rock, jazz, e.g.), a weight from 0–9 where 0 means no relationship between the artist and the style and 9 means the strongest relationship |
| ToneWeight(Artist, Tone) | For each artist and each of one or more tones of the artist (mellow, loud, e.g.), a weight from 0–9 where 0 means no relationship between the artist and the tone and 9 means the strongest relationship |
| Popularity(Artist) | For each artist, a popularity measure from 0–3 where 0 means the least popular |
| Importance(Artist) | For each artist, an importance measure from 0–3 where 0 means the least important |

-continued

| | |
|---|---|
| Quality(Artist) | For each artist, a quality measure from 0–3 where 0 means the lowest quality artist |
| Decades(Artist) | Or each artist, a list of decades in which an artist has been active |
| Relationship(Artist1, Artist2, ConnectionType) | For each of multiple pairs of artists, a measure of whether a relationship exists therebetween from 0–9 where 0 means not related at all and 9 means highly related; possible ConnectionTypes are "Similar", "Also Known As", "Formal Connection", "Influenced By", "Member of Group", "Performed Songs By", and "Worked With". |
| SameArtist(Artist1, Artist2) | For each of multiple pairs of artists, an indication of whether the artists are one and the same where 1 indicates that Artist1 is Artist2 and 0 indicates otherwise |
| SameGender(Artist1, Artist2) | For each of multiple pairs of artists, an indication of whether the artists have the same Gender where 1 indicates that Artist1 and Artist2 have the same gender and 0 indicates otherwise |
| SameGroup(Artist1, Artist2) | For each of multiple pairs of artists, an indication of whether the artists are in the same group together where 1 indicates that Artist1 and Artist2 are both in the same group and 0 indicates otherwise 0 |

AMG Album Data

| | |
|---|---|
| StyleWeight(Album, Style) | For each album and each of one or more styles of the album (country, rock, jazz, e.g), a weight of 1 if the album bears the style or a 0 otherwise |
| GlobalRating(Album) | For each album, a rating from 0–9 where 0 means unrated, with 1 being the worst and 9 being the highest quality album within the entire body of AMG albums |
| LocalRating(Album) | For each album, a rating from 0–9 where 0 means unrated, with 1 being the worst and 9 being the highest quality album within the body of work of the album artist |
| Pick(Album) | For each album, a number from 0–2 where 0 means not a pick, 1 means an artist pick, and 2 means a top artist pick |
| TopPick(Album) | For each album, 1 if Pick(Album) == 2 |
| RegularPick(Album) | For each album, 1 if Pick(Album) == 1 |
| ReleaseYear(Album) | For each album, a four digit release year or 0 if unknown |
| HasContent(Album) | For each album, 1 if the album has 1 or more songs that can be played on the radio, 0 otherwise |

Thus, such information in such database 32 may be employed to compute ordered lists of artists similar to a specific artist and the like, as set forth in more detail below.

Figure 4:
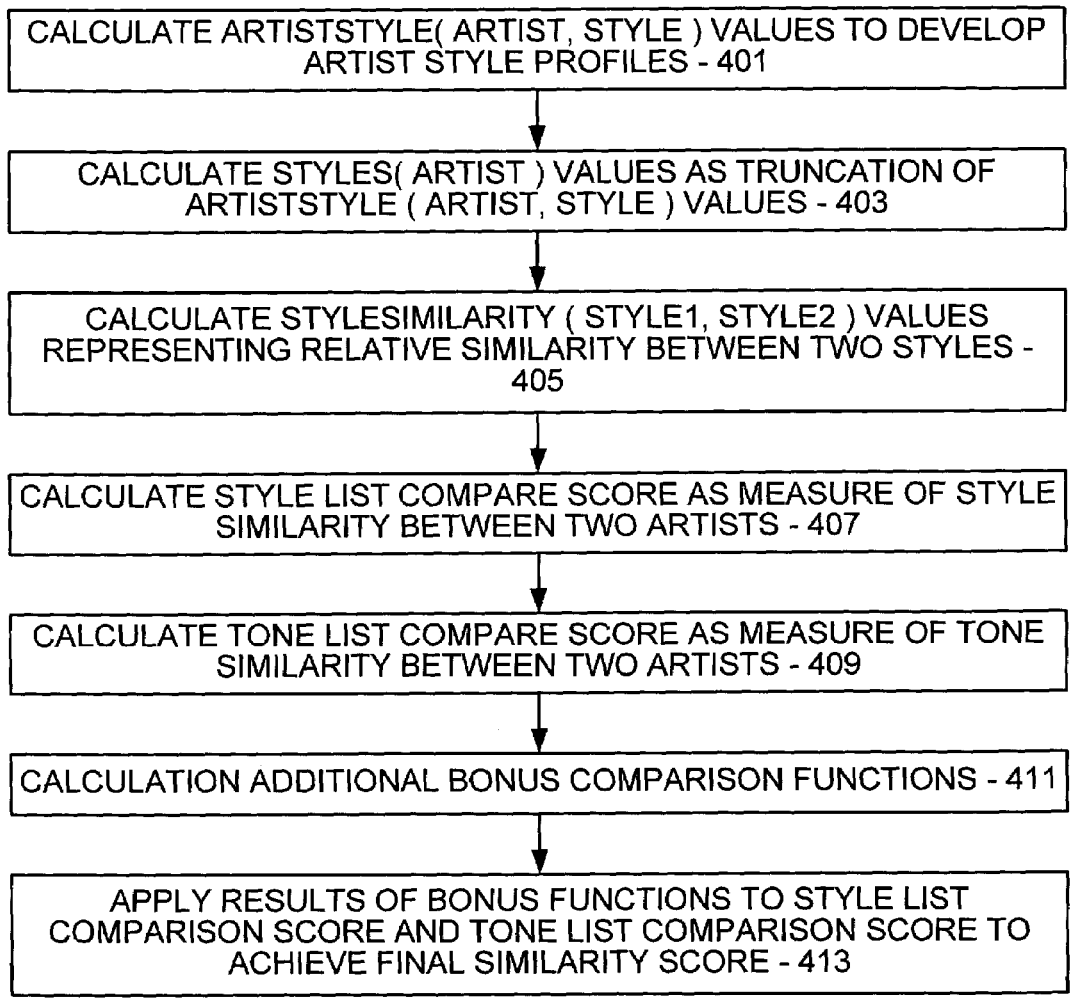
FIG. 4 is a flow diagram showing key steps performed by the process/computer of FIG. 3 to determine similarity as between artists/albums in accordance with one embodiment of the present invention.

In particular, and turning now to FIG. 4, prior to calculating similarity values, it has been found useful to calculate certain intermediate values in order to among other things simplify later calculations. One set of intermediate values in particular that is calculated is a set of aggregate ArtistStyle (Artist, Style) values (step 401). As may be appreciated, each such ArtisitStyle(Artist, Style) value is for each artist and each of one or more styles thereof, and is an aggregation of the AMG artist style weights and the AMG album style weights by the artist. By looking at each artist's album style weights in addition to the artist's style weight, a more complete and accurate artist style profile is developed. In one embodiment of the present invention:

ArtistStyle(Artist, Style)=10*StyleWeight(Artist, Style)+ΣArtist Albums (StyleWeight(Album, Style)*( 1+LocalRating(Album)+Pick(Album)))

An example of calculating such an aggregate ArtistStyle value follows. Presume an artist "Bill Monroe" has been assigned by way of StyleWeight(Artist, Style) Bluegrass (9), Bluegrass Gospel (9), and Traditional Bluegrass (9), and that such artist has only 2 albums: "The High Lonesome Sound of Bill Monroe" with LocalRating (8), Pick (8), and Style-Weights Bluegrass (8) and Traditional Bluegrass (8); and "I Saw the Light" with LocalRating (0) (unrated), Pick (0), and StyleWeights Bluegrass (8), Bluegrass Gospel (8), Traditional Bluegrass (8). The calculation of ArtistStyle("Bill Monroe", "Bluegrass") would thus be:

$$10 * StyleWeight(\text{"BillMonroe"}, \text{"Bluegrass"}) +$$
$$StyleWeight(\text{"High Lonesome ..."}, \text{"Bluegrass"}) *$$
$$(1 + LocalRating\text{"High ..."}) + Pick(\text{"High ... "})) +$$
$$StyleWeight(\text{"Saw the ... "},$$
$$\text{"Bluegrass"} * (1 + LocalRating(\text{"Saw the ... "}) + Pick(\text{"Saw ... "})) =$$
$$(10 * 9) + 1 * (1 + 8 + 1) + 1 * (1 + 0 + 0) = 101$$

Similarly, ArtistStyle("Bill Monroe", "Bluegrass Gospel") would be:

$$(10*9) + 0*(1+8+1) + 1*(1+0+0) = 91, \text{ and}$$

ArtistStyle("Bill Monroe","Bluegrass") would be:

$$(10*9) + 1*(1+8+1) + 1*(1+0+0) = 101$$

As should be appreciated, the ArtistStyle value for each artist and each style thereof is essentially a refinement of the AMG assigned style weights that in essence results in a final weight for each style of an artist based on the StyleWeights of the artist and the albums thereof. Although the above example presumed only three styles for Bill Monroe and two albums, if it were the case that Bill Monroe had additional albums and styles, it could be that the following ArtistStyle values are calculated:
Traditional Bluegrass (322)
Bluegrass (291)
Bluegrass-Gospel (107)
Traditional Folk (7)
Old-Timey (4)

As a result of such calculations, it should be evident that Bill Monroe is mainly a Bluegrass-type artist, with some small aspects of other styles. More importantly, such calculation has been shown at least empirically to be a more accurate reflection of Bill Monroe's style than could have been appreciated from the raw artist data in the database 32, which again was Bluegrass (9), Bluegrass Gospel (9), Traditional Bluegrass (9).

Another set of intermediate values that is calculated is a set of Styles(Artist) values (step 403). As may be appreciated, such set of Styles(Artist) values is a truncation of the set of ArtistStyle (Artist, Style) values calculated at step 403 for the purpose of culling low-weight styles that are not especially significant. By so truncating, it has been shown, at least empirically, that the remaining ArtistStyle (Artist, Style) values achieve better matching performance and higher result quality, as will be evident below.

In one embodiment of the present invention, the set of Styles(Artist) values is obtained based on the following rules:
1) ArtistStyle (Artist, Style) values after the highest weight ArtistStyle (Artist, Style) value are culled if less than 15 percent thereof; and
2) ArtistStyle (Artist, Style) values beyond the 4th highest weight value are culled if less than 40 percent of the highest weight ArtistStyle (Artist, Style) value.

As an example, then, and based on the five ArtistStyle values for bill Monroe of Traditional Bluegrass (322), Bluegrass (291), Bluegrass-Gospel (107), Traditional Folk (7), and Old-Timey (4), application of the second rule requires removal of all values less than 40 percent of the 322 value (128.8) for Traditional Bluegrass if such value is not one of the 4 highest weighted, which in this case is Old-Timey (4). Thus, Traditional Bluegrass (322), Bluegrass (291), Bluegrass-Gospel (107), and Traditional Folk (7) remain.

Application of the second rule requires removal of all values less than 15 percent of the 322 value (48.3) for Traditional Bluegrass, which in this case is Traditional Folk (7) (and also Old-Timey (4), which was already removed). Thus, Traditional Bluegrass (322), Bluegrass (291), and Bluegrass-Gospel (107) remain. As may be appreciated, such remaining three styles and their corresponding values are to be employed for comparing Bill Monroe to other artists, as will be set forth in more detail below.

Still another set of intermediate values that is calculated is a set of StyleSimilarity (Style1, Style2) values (step 405). In particular, each StyleSimilarity (Style1, Style2) value sets forth a relative similarity as between two styles. In one embodiment of the present invention, each such similarity weight is based on the rate of co-occurrence of styles for artists and albums, where important artists and albums are weighted more heavily and where the value is normalized to 1000.

In one embodiment of the present invention, then, to calculate each StyleSimilarity (Style1, Style2) value, the following four sub-values are calculated:

ArtistMagnitude(Artist) (a measure of magnitude for each artist)= 4+Importance(Artist)+Quality(Artist)+Popularity(Artist);

AlbumMagnitude(Album) (a measure of magnitude for each album)= 3+Pick(Album)+(GlobalRating(Album)−6[if GlobalRating(Album)>6, 0 otherwise]));

CoStyleSum(Style1, Style2)= ΣArtistMagnitude(Artist) [over all artists with Style1 and Style2]+ΣAlbumMagnitude(Album) [over all albums with Style1 and Style2]; and StyleSum(Style)= ΣArtistMagnitude(Artist) [over all artists with Style]+ΣAlbumMagnitude(Album) [over all albums with Style];

Based on the four aforementioned sub-values, then, StyleSimilarity(Style1,Style2) may be defined as:

1000*CoStyleSum(Style1, Style2)/(StyleSum(Style1)+StyleSum(Style2)−CoStyleSum(Style1,Style2))

As an example of a calculation of such a StyleSimilarity (Style1,Style2), assume database 32 defines a catalog of 3 albums:
"The High Lonesome Sound of Bill Monroe", with Global Rating (8), Pick: (1), and styles Bluegrass (1) and Traditional Bluegrass (1);
"I Saw the Light", with Global Rating (0) (unrated), Pick: (0), and styles Bluegrass (1), Bluegrass Gospel (1), and Traditional Bluegrass (1); and
"Flecktones", with Global Rating (6), Pick (2), and styles Progressive Bluegrass (1) and Bluegrass (1)

Also, assume database 32 defines a catalog of 2 artists:
Bill Monroe, with Popularity (3), Importance (3), and Quality (3) and styles Bluegrass (9), Bluegrass Gospel (9), and Traditional Bluegrass (9); and
Bela Fleck, with Popularity (2), Importance (8), and Quality (3) and styles Progressive Bluegrass (9) and Bluegrass (7).

To compute how similar the styles "Bluegrass" and "Bluegrass Gospel" are, StyleSimilarity("Bluegrass", "Bluegrass Gospel") would be calculated as:

1000*CoStyleSum("Bluegrass", "Bluegrass Gospel")/(StyleSum("Bluegrass")+StyleSum("Bluegrass Gospel")−CoStyleSum("Bluegrass","Bluegrass Gospel")), CoStyleSum("Bluegrass", "Bluegrass Gospel") would be calculated as:

ArtistMagnitude("Bill Monroe")+AlbumMagnitude("I Saw the Light")=13+3=16,

StyleSum("Bluegrass") would be calculated as:

ArtistMagnitude("Bill Monroe")+ ArtistMagnitude ("Bela Fleck")+AlbumMagnitude("I Saw the Light")+AlbumMagnitude("High Lonesome Sound")+AlbumMagnitude("Flecktones") =13+10+3+6+5=37, StyleSum("Bluegrass Gospel") would be calculated as:

ArtistMagnitude("Bill Monroe")+AlbumMagnitude("I Saw the Light")=13+3=16, and

StyleSimilarity("Bluegrass", "Bluegrass Gospel") would be calculated as:

(1000*16)/(37+16−16)=432.

Based on all the intermediate values as calculated in steps 401–405, then, the main part of the similarity comparison process may now be performed in the manner set forth below. Briefly, and to review, such similarity comparison process is performed to determine and rank what artists/albums are of a similar style and tone as compared with a selected album/artist.

In one embodiment of the present invention, the similarity comparison process relies on the following functions to determine and rank what artists and albums are of a similar style and tone.

StyleListCompare(A, B)—this function compares two sets of weighted styles (A and B) and arrives at a similarity score, with 0 representing complete dissimilarity and 1000 representing complete similarity. The function is as follows:

StyleListCompare(A, B)=(Compare(A, B)+Compare(B, A))/2 where, $$Compare(A, B) = \sum_{a \in A}^{n} \max\{StyleSimilarity(a, b \in B)\} \times \frac{Weight(a)}{\sum_{x \in A} Weight(x)}$$

Note that the (StyleSimilarity) sub-function in essence chooses the highest value Style Similarity associated with the style.

Figure 5:
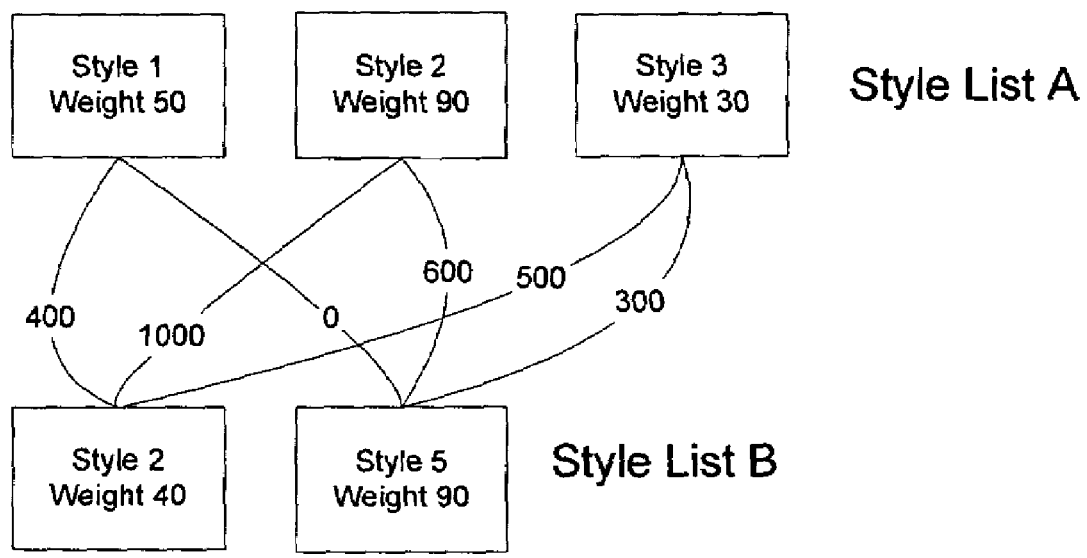
FIG. 5 is a block diagram showing style lists to be compared by the process of FIG. 3 in accordance with one embodiment of the present invention.

For example, and as seen in FIG. 5, if an artist A has a Style List A as calculated in a manner set forth above, with Style 1 having Weight 50, Style 2 having Weight 90, and Style 3 having Weight 30; if an artist B has a Style List B as calculated in a manner set forth above, with Style 2 having Weight 40, and Style 5 having Weight 90; and if Style 1 has a Style Similarity to Style 2 of 400, Style 2 has a Style Similarity to Style 2 of 1000 (by definition), Style 3 has a Style Similarity to Style 2 of 500, Style 1 has a Style Similarity to Style 5 of 0, Style 2 has a Style Similarity to Style 5 of 600, and Style 3 has a Style Similarity to Style 5 of 300, then Compare(A, B)=(50/170)*400+(90/170)*1000+(30/170)*500=735 and

Compare(B, A)=(40/130)*1000+(90/130)*600=723

Thus, StyleListCompare(A, B)=(723+735)/2=729

ToneListCompare(A, B)—this function compares two sets of tones. It is identical to the StyleListCompare function except that StyleSimilarity(style1, style2) in the Compare function is substituted with ToneSimilarity(tone1, tone2). Here, ToneSimilarity is defined simply: identical tones have a score of 1000, while different tones have a score of 0. Because artists have a large number of tones, this simplification is simply a performance optimization. A more accurate tone similarity comparison may be substituted to improve results without departing from the spirit and scope of the present invention.

For example, if the aforementioned Bill Monroe has tones: Plaintive (7), Earthy (6), Rousing (5), Sad (5), Freewheeling (5), and Exuberant (5), and if the aforementioned Bela Fleck has tones: Sophisticated (3), Cerebral (3), and Freewheeling (3), Compare(A, B)=(7/33)*0+(6/33)*0+(5/33)* 0+(5/33)*0+(5/33)*1000+(5/33)*0

Compare(B, A)=(3/9)*0+(3/9)*0+(3/9)*1000, and

ToneListCompare("Bill Monroe", "Bela Fleck")= (Compare(A, B)+Compare(B, A))/2=242

Thus, and to recap, in one embodiment of the present invention, to compare two artists, one would calculate a Style List Compare score for the two artists (step 407, FIG. 4), and would also calculate a Tone List Compare score for the two artists (step 409), where a higher one of each score represents a greater similarity between the two artists. As should be appreciated, scores may for example be calculated for a comparison of a particular artist to a plurality of other artists, and the scores may then be sorted highest first to develop a list of most similar artists to the particular artist.

In one embodiment of the present invention, in addition to the Style List Comparison and Tone List Comparison functions set forth above, additional 'bonus' comparison functions may also be employed to determine similarity between artists/albums (step 411). In particular, such bonus comparison functions are employed to determine a matching bonus based on a comparison between values for two artists or two albums. In one embodiment of the present invention, the results of the bonus functions are applied to the scores obtained from the Style List Comparison and Tone List Comparison functions to achieve a final score (step 413). For example, the sum of all the results of the bonus functions may be applied as a multiplier to a combination of the Style List Comparison and Tone List Comparison functions to achieve the final score.

Examples of such bonus functions are many and varied. One bonus function may be based on a comparison of active decades of artists, where the bonus function value increases as artists share more active decades. Another bonus function may be based on a comparison of artist album release years, where the bonus function value increases as release years of albums are closer together. Yet another bonus function may be based on whether an artist can based on artist popularity, importance and quality data from the database 32 be considered to have higher overall quality, and a related bonus function may be based on whether albums of an artist can based on album popularity data from the database 32 be considered to have higher overall quality. Note that some bonus functions may result in a negative value to reflect in a negative manner on the measured aspect.

In one embodiment of the present invention, and further to step 413, each of the scores obtained from the Style List Comparison and Tone List Comparison is scaled and the scaled scores are combined prior to applying the results of the bonus functions thereto to achieve the final score. That is:

Final Score=Bonus Result (A*Style Score+B*Tone Score).

For example, A may be 0.8 and B may be 0.2, and Bonus Result is a function applied to the sum thereof. In one embodiment of the present invention, and as was set forth above, the Bonus Function is simply a multiplication of the sum of all the results of the bonus functions and the combination of the Style Score and Tone Score.

Similar to artist similarity, album similarity is based on the style similarity of the albums, the similarity of the artists on the albums, the year the album was released, and the quality of the album. Likewise, with the same functions as above, albums can be compared to a particular artist and vice-versa.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided to determine similar artists/works that relies on data already generated for a plurality of artists and works and that therefore is relatively more efficient. The method and mechanism takes into account factors such as styles, tones, popularity, temporal factors, and the like.

It should be appreciated that changes could be made to the embodiments described above without departing from the inventive concepts thereof. Most notably, although the present invention is directed to comparing artists/albums based on assigned weights, the present invention could also be applied to any other field requiring measuring of similarity in a population of weighted style lists, especially inasmuch as the processes set forth herein can be employed to computing similarity of individual styles based on the frequency that they occur together. It should be understood, therefore, that this invention is not limited to the particular embodiments disclosed, but it is intended to cover modifications within the spirit and scope of the present invention as defined by the appended claims.

The invention claimed is:

1. A method of determining a numerical value of similarity as between a pair of artists, the method comprising:
   calculating for each artist a list of artist style values, each artist style value being representative of a style of the artist and a weight of such style as exhibited by such artist;
   calculating a set of style similarity values, each style similarity value setting forth a relative similarity as between two styles; and
   calculating, based on the list of artist style values for each artist and the calculated set of style similarity values, a style list comparison similarity score representing a relative similarity of the styles of the pair of artists,
   the method further comprising truncating the list of artist style values for each artist to cull low-weight styles therein, and comprising calculating, based on the truncated list of artist style values for each artist and the calculated set of style similarity values, a style list comparison similarity score representing a relative similarity of the styles of the pair of artists.

2. The method of claim 1 wherein truncating the list for each artist comprises culling any artist style value after a highest weight value if less than a predetermined percentage thereof.

3. The method of claim 1 wherein truncating the list for each artist comprises culling any artist style value if less than an Nth highest weight value.

4. The method of claim 1 further comprising:
   obtaining for each artist a list of artist tone values, each artist tone value being representative of a tone of the artist and a weight of such tone as exhibited by such artist; and
   calculating, based on the list of artist tone values for each artist, a tone list comparison similarity score representing a relative similarity of the tones of the pair of artists.

5. The method of claim 4 further comprising:
   calculating a bonus comparison function that results in a bonus weight representative of an aspect of at least one of the pair of artists;
   applying the bonus weight to a combination of the style list comparison similarity score and the tone list comparison similarity score to achieve a final similarity score.

6. The method of claim 5 comprising multiplying the bonus weight by a weighted sum of the style list comparison similarity score and the tone list comparison similarity score to achieve the final similarity score.

7. The method of claim 6 wherein the final similarity score is:

Bonus Weight*(0.8*Style Score+0.2*Tone Score).

8. The method of claim 1 further comprising:
   calculating a bonus comparison function that results in a bonus weight representative of an aspect of at least one of the pair of artists;
   applying the bonus weight to the style list comparison similarity score to achieve a final similarity score.

9. The method of claim 8 comprising multiplying the bonus weight by the style list comparison similarity score to achieve the final similarity score.

10. A method of determining a numerical value of similarity as between a pair of comparison subjects, the method comprising:
   calculating for each comparison subject a list of comparison subject attribute values, each comparison subject attribute value being representative of an instance of an attribute of the comparison subject and a weight of such instance as exhibited by such comparison subject;
   calculating a set of attribute instance similarity values, each attribute instance similarity value setting forth a relative similarity as between two instances of the attribute; and
   calculating, based on the list of comparison subject attribute values for each comparison subject and the calculated set of attribute instance similarity values, an attribute instance list comparison similarity score representing a relative similarity of the instances of the attribute of the pair of comparison subjects,
   the method further comprising truncating the list of comparison subject attribute values for each comparison subject to cull low-weight attribute instances therein, and comprising calculating, based on the truncated list of comparison subject attribute values for each comparison subject and the calculated set of attribute instance similarity values, an attribute instance list comparison similarity score representing a relative similarity of the instances of the attribute of the pair of comparison subjects.

11. The method of claim 10 wherein truncating the list for each comparison subject comprises culling any comparison subject attribute value after a highest weight value if less than a predetermined percentage thereof.

12. The method of claim 10 wherein truncating the list for each comparison subject comprises culling any comparison subject attribute value if less than an Nth highest weight value.

13. The method of claim 10 further comprising:
obtaining for each comparison subject another list of comparison subject attribute values, each comparison subject attribute value in the another list being representative of an instance of another attribute of the comparison subject and a weight of such another instance as exhibited by such comparison subject; and
calculating, based on the another list of comparison subject attribute values for each comparison subject, another attribute instance list comparison similarity score representing a relative similarity of the instances of the another attribute of the pair of comparison subjects.

14. The method of claim 13 further comprising:
calculating a bonus comparison function that results in a bonus weight representative of an aspect of at least one of the pair of comparison subjects;
applying the bonus weight to a combination of the attribute list comparison similarity score and the another attribute list comparison similarity score to achieve a final similarity score.

15. The method of claim 14 comprising multiplying the bonus weight by a weighted sum of the attribute list comparison similarity score and the another attribute list comparison similarity score to achieve the final similarity score.

16. A method of determining a numerical value of similarity as between a pair of comparison subjects, the method comprising:
calculating for each comparison subject a list of comparison subject attribute values, each comparison subject attribute value being representative of an instance of an attribute of the comparison subject and a weight of such instance as exhibited by such comparison subject;
calculating a set of attribute instance similarity values, each attribute instance similarity value setting forth a relative similarity as between two instances of the attribute; and
calculating, based on the list of comparison subject attribute values for each comparison subject and the calculated set of attribute instance similarity values, an attribute instance list comparison similarity score representing a relative similarity of the instances of the attribute of the pair of comparison subjects,
the method further comprising:
calculating a bonus comparison function that results in a bonus weight representative of an aspect of at least one of the pair of comparison subjects;
applying the bonus weight to the attribute list comparison similarity score to achieve a final similarity score.

17. The method of claim 16 comprising multiplying the bonus weight by the attribute list comparison similarity score to achieve the final similarity score.

* * * * *

UNITED STATES PATENT AND TRADEMARK OFFICE
CERTIFICATE OF CORRECTION

PATENT NO. : 6,987,222 B2  
APPLICATION NO. : 10/673978  
DATED : January 17, 2006  
INVENTOR(S) : Paul Deeds It is certified that error appears in the above-identified patent and that said Letters Patent is hereby corrected as shown below:

In column 6, line 45, delete "interface" and insert -- Interface --, therefor.

In column 9, line 4, delete "Or" and insert -- For --, therefor.

In column 9, line 54, after "such" delete "ArtisitStyle" and insert -- ArtistStyle --, therefor.

In column 10, line 47, after "Pick" delete "(8)" and insert -- (1) --, therefor.

In column 10, line 48, after "Weights Bluegrass" delete "(8)" and insert -- (1) --, therefor.

In column 10, line 48, after "Traditional Bluegrass" delete "(8)" and insert -- (1) --, therefor.

In column 10, line 50, after "Weights Bluegrass" delete "(8)" and insert -- (1) --, therefor.

In column 10, line 50, after "Bluegrass Gospel" delete "(8)" and insert -- (1) --, therefor.

In column 10, line 51, after "Bluegrass" delete "(8)" and insert -- (1) --, therefor.

In column 12, line 26, after "wise])" delete ")".

UNITED STATES PATENT AND TRADEMARK OFFICE
CERTIFICATE OF CORRECTION

PATENT NO. : 6,987,222 B2
APPLICATION NO. : 10/673978
DATED : January 17, 2006
INVENTOR(S) : Paul Deeds It is certified that error appears in the above-identified patent and that said Letters Patent is hereby corrected as shown below:

In column 12, line 51, after "and Bluegrass (1)" insert -- . --.

In column 12, line 57, after "Importance" delete "(8)" and insert -- (1) --, therefor.

Signed and Sealed this

Eighth Day of September, 2009

David J. Kappos
*Director of the United States Patent and Trademark Office*